(12) United States Patent
Mir et al.

(10) Patent No.: US 10,838,209 B2
(45) Date of Patent: Nov. 17, 2020

(54) HEAD MOUNTED IMAGING APPARATUS WITH CURVED LENSLET ARRAY

(71) Applicant: Vuzix Corporation, West Henrietta, NY (US)

(72) Inventors: Jose M. Mir, Rochester, NY (US); Robert J. Schultz, Farmington, NY (US)

(73) Assignee: Vuzix Corporation, West Henrietta, NY (US)

( * ) Notice: Subject to any disclaimer, the term of this patent is extended or adjusted under 35 U.S.C. 154(b) by 131 days.

(21) Appl. No.: 15/538,122

(22) PCT Filed: Jan. 6, 2016

(86) PCT No.: PCT/US2016/012376
§ 371 (c)(1),
(2) Date: Jun. 20, 2017

(87) PCT Pub. No.: WO2016/112128
PCT Pub. Date: Jul. 14, 2016

(65) Prior Publication Data
US 2018/0003977 A1    Jan. 4, 2018

Related U.S. Application Data

(60) Provisional application No. 62/100,355, filed on Jan. 6, 2015.

(51) Int. Cl.
*G02B 27/01* (2006.01)
*G02B 3/00* (2006.01)

(52) U.S. Cl.
CPC ....... *G02B 27/0172* (2013.01); *G02B 3/0006* (2013.01); *G02B 27/0176* (2013.01);
(Continued)

(58) Field of Classification Search
CPC .............. G02B 27/0172; G02B 3/0006; G02B 27/0176; G02B 2027/0123; G02B 2027/0145
(Continued)

(56) References Cited

U.S. PATENT DOCUMENTS 5,483,307 A    1/1996    Anderson
5,701,132 A    12/1997   Kollin et al.
(Continued)

FOREIGN PATENT DOCUMENTS

CN    1894617 A    1/2007
EP    1798587 B1   6/2007
(Continued)

OTHER PUBLICATIONS

International Search Report and Written Opinion from corresponding International Application No. PCT/US2016/012376.
(Continued)

*Primary Examiner* — George G King
(74) *Attorney, Agent, or Firm* — Thomas B. Ryan, Patent Agent; Jacob D. Merrill, Esq.; Harter Secrest & Emery LLP

(57) ABSTRACT

A head-mounted imaging apparatus has a projector that is energizable to project image-bearing light and a light-conditioning element that directs and shapes the image-bearing light from the projector to form a real image plane. A lenslet array is positioned adjacent to the real image plane and optically disposed at substantially one focal length away from a curved mirror, wherein the surface of the curved mirror is substantially spherical. There is a beamsplitter in the path of light from the real image at the lenslet array and disposed to direct at least a portion of the light from the real image toward the curved mirror. The curved mirror directs
(Continued)

light from the beamsplitter to form a virtual image for an observer who wears the head-mounted imaging apparatus.

9 Claims, 9 Drawing Sheets

(52) U.S. Cl.
CPC ............... *G02B 2027/0123* (2013.01); *G02B 2027/0145* (2013.01)

(58) Field of Classification Search
USPC ........................................................ 359/631
See application file for complete search history.

(56) References Cited

U.S. PATENT DOCUMENTS

| | | | |
|---|---|---|---|
| 5,757,544 A | 5/1998 | Tabata et al. | |
| 5,812,323 A | 9/1998 | Takahashi | |
| 5,984,477 A | 11/1999 | Weissman et al. | |
| 6,369,952 B1* | 4/2002 | Rallison | G02B 27/017 359/630 |
| 6,416,181 B1 | 7/2002 | Kessler et al. | |
| 6,487,021 B1 | 11/2002 | Ophey | |
| 6,522,474 B2 | 2/2003 | Cobb et al. | |
| 2005/0007673 A1 | 1/2005 | Chaoulov et al. | |
| 2005/0013005 A1 | 1/2005 | Rogers | |
| 2007/0217018 A1 | 9/2007 | Fredriksson | |
| 2012/0105310 A1 | 5/2012 | Sverdrup | |
| 2012/0154920 A1 | 6/2012 | Anderson | |
| 2014/0204003 A1 | 7/2014 | Deering et al. | |
| 2015/0009550 A1 | 1/2015 | Misago et al. | |
| 2017/0235154 A1* | 8/2017 | Uchida | G02B 3/0043 359/599 |

FOREIGN PATENT DOCUMENTS

| | | | | |
|---|---|---|---|---|
| EP | 2194418 A1 | | 6/2010 | |
| FR | 2858068 A1 | | 1/2005 | |
| JP | H08190072 A | | 7/1996 | |
| JP | H10301055 A | | 11/1998 | |
| JP | 2004101197 A | | 4/2004 | |
| JP | 2010145745 A | * | 7/2010 | ............ B60K 35/00 |
| JP | 2010145745 A | | 7/2010 | |
| JP | 2010145922 A | | 7/2010 | |
| JP | 2014026088 A | | 2/2014 | |
| KR | 1020130116547 A | | 10/2013 | |
| WO | 2005062105 A1 | | 7/2005 | |
| WO | 2009066408 A1 | | 5/2009 | |
| WO | 2013146096 A1 | | 10/2013 | |

OTHER PUBLICATIONS

Chinese Patent Office, First Search Report (with English translation), CN Application No. 201680004239.3, dated Jun. 21, 2019.
European Patent Office, Supplementary European Search Report, EP Application No. 16 73 5371, dated Jul. 26, 2018.
Japanese Patent Office, Search Report, JP Application No. 2017-531501, dated Oct. 16, 2019.

* cited by examiner

HEAD MOUNTED IMAGING APPARATUS WITH CURVED LENSLET ARRAY

TECHNICAL FIELD

This invention generally relates to electronic displays and more particularly relates to a wearable electronic display that forms a virtual image.

BACKGROUND OF THE INVENTION

Head-Mounted Displays (HMDs), which include near eye displays in a form resembling conventional eyeglasses or sunglasses, are being developed for a range of diverse uses, including military, commercial, industrial, fire-fighting, and entertainment applications. For many of these applications, there is particular value in forming a virtual image that can be visually superimposed over the real-world image that lies in the field of view of the HMD user.

In general, HMD optics must meet a number of basic requirements for viewer acceptance, including the following:
  (i) sufficient eye relief or eye clearance. The eye relief range is defined based on viewer comfort and the optical configuration of the human eye itself. In practice, the distance between the last optical surface of the HMD optics and the viewer's eye is preferably above about 20 mm.
  (ii) appropriate pupil size. Pupil size requirements are based on physiological differences in viewer face structure as well as on gaze redirection during viewing. A pupil size of at least about 10 mm diameter has been found to be desirable.
  (iii) field of view. A wide field of view is preferable. For many visual tasks, such as targeting and object recognition, a field of view (FOV) approaching about 50 degrees is considered to be desirable.
  (iv) brightness. The virtual image that is generated should have sufficient brightness for good visibility and viewer comfort.

Aspects (i)-(iii) relate to the eyebox. The eyebox relates to the volume within which the eye of the observer can comfortably view the image. The size of the eyebox depends in part on the length of the path of the light from the image source to where the image is viewed and image source size, and in part on the divergence of the image source and/or the collimation of the light after its emission by the image source. The desirable size of the eye box depends largely on the quality of viewing experience that is desired from the display.

In addition to optical requirements, HMD designs must also address practical factors such as variable facial geometry, acceptable form factor with expectations of reduced size for wearing comfort, weight, and cost, and ease of use.

A goal for most HMD systems is to make the imaging/relay system as compact as possible; however, when using conventional optics, there are basic limits. The output of the optic system must have a pupil that is large enough to support a reasonably sized virtual image and also allow for some movement of the eye. In a binocular system there is also the issue of varying intraocular distance (IOD) among different users and the need for the output pupil of the optical system to allow for this. Especially for the case of wide FOV of 60 degrees of greater, eye movement, user variations of IOD, and human pupil size may require horizontal output pupil size of 20 mm or greater. Although this may be achieved in very large immersive displays having long paths from the image source to where the image is viewed (e.g. U.S. Pat. No. 6,416,181 to Kessler et al), compact HMD's having short optical paths impose significant challenges on the divergence of the collimated virtual image. As a result, wide FOV compact HMD's often require the use of fast optics which can be bulky, complex, costly, and exhibit spherical and other aberrations.

Wide FOV imaging systems having "monocentric" designs using ball lenses have been described in the prior art for very large systems (as in the previously mentioned U.S. Pat. No. 6,416,181 to Kessler et al). Due to the long projection distances, large systems such as these can easily produce large output pupil sizes in spite of relatively narrow beam divergence. The image projected by the symmetric ball lens optics is in the path between the observer and collimating mirror, preventing the use of additional beam expanding elements. More compact HMD optics that use ball lenses and monocentric optical designs have also been proposed (see, for example, U.S. Pat. No. 6,522,474 B2 to Cobb et al). In those cases, however, ball lenses forming the image located at the focal plane of by a spherical mirror requires a large beam divergence to achieve the large output pupils given the short eye distances. Unfortunately, ball lenses or other monocentric optics used at high diverging angles exhibit significant spherical aberration which degrades the virtual image and ultimately compromises the required image resolution for high definition content.

Compact HMD's using concave mirrors and a "semitransmissive" elements for projecting an images have been described (see, for example, U.S. Pat. No. 5,812,323 to Takahashi, and U.S. Pat. No. 6,487,021 BI to Ophey). In these cases, glass prismatic elements with planar or flat surfaces are able to project an image produced by a display (e.g. OLED, LCOS) coupled into one of the facets of the semitransmissive element. In order to achieve wide FOV's greater than 50 degrees, the image display must be of significant size, e.g. 20 mm or more. Since cost of semiconductor display technology increases dramatically with size, such displays can be very costly. This negatively impacts HMD price. Furthermore, the prism-like geometries of the semitransmissive elements complicate their use in augmented reality configurations, since their curved or angled surfaces refract light from the direct "see-through" or ambient environment. Therefore, in order for these systems to be used in augmented reality modes, either corrective optics or digital imagers must be used, increasing cost, size, and weight.

For these reasons, conventional HMD designs fail to provide economical solutions to simultaneously achieving high FOV, very large output pupils, means to simply achieve augmented reality and digital high definition content, with compact geometries for wearability.

SUMMARY OF THE INVENTION

It is an object of the present disclosure to advance the art of virtual image presentation using compact head-mounted devices. Advantageously, embodiments of the present disclosure provide an enlarged pupil size presenting high resolution wide FOV content to viewers having wide range of IOD's with minimal or no optical adjustment required.

These and other aspects, objects, features and advantages of the present invention will be more clearly understood and appreciated from a review of the following detailed description of the preferred embodiments and appended claims, and by reference to the accompanying drawings.

According to an aspect of the present disclosure, there is provided a head-mounted imaging apparatus that comprises:
- a projector that is energizable to project image-bearing light;
- a light-conditioning element that directs and shapes the image-bearing light from the projector to form a real image plane;
- a lenslet array positioned adjacent to the real image plane and optically disposed at substantially one focal length away from a curved mirror, wherein the surface of the curved mirror is substantially spherical; and
- a beamsplitter in the path of light from the real image at the lenslet array and disposed to direct at least a portion of the light from the real image toward the curved mirror;
- wherein the curved mirror directs light from the beamsplitter to form a virtual image for an observer who wears the head-mounted imaging apparatus.

BRIEF DESCRIPTION OF THE DRAWING FIGURES

While the specification concludes with claims particularly pointing out and distinctly claiming the subject matter of the present invention, it is believed that the invention will be better understood from the following description when taken in conjunction with the accompanying drawings.

Figure 7A:
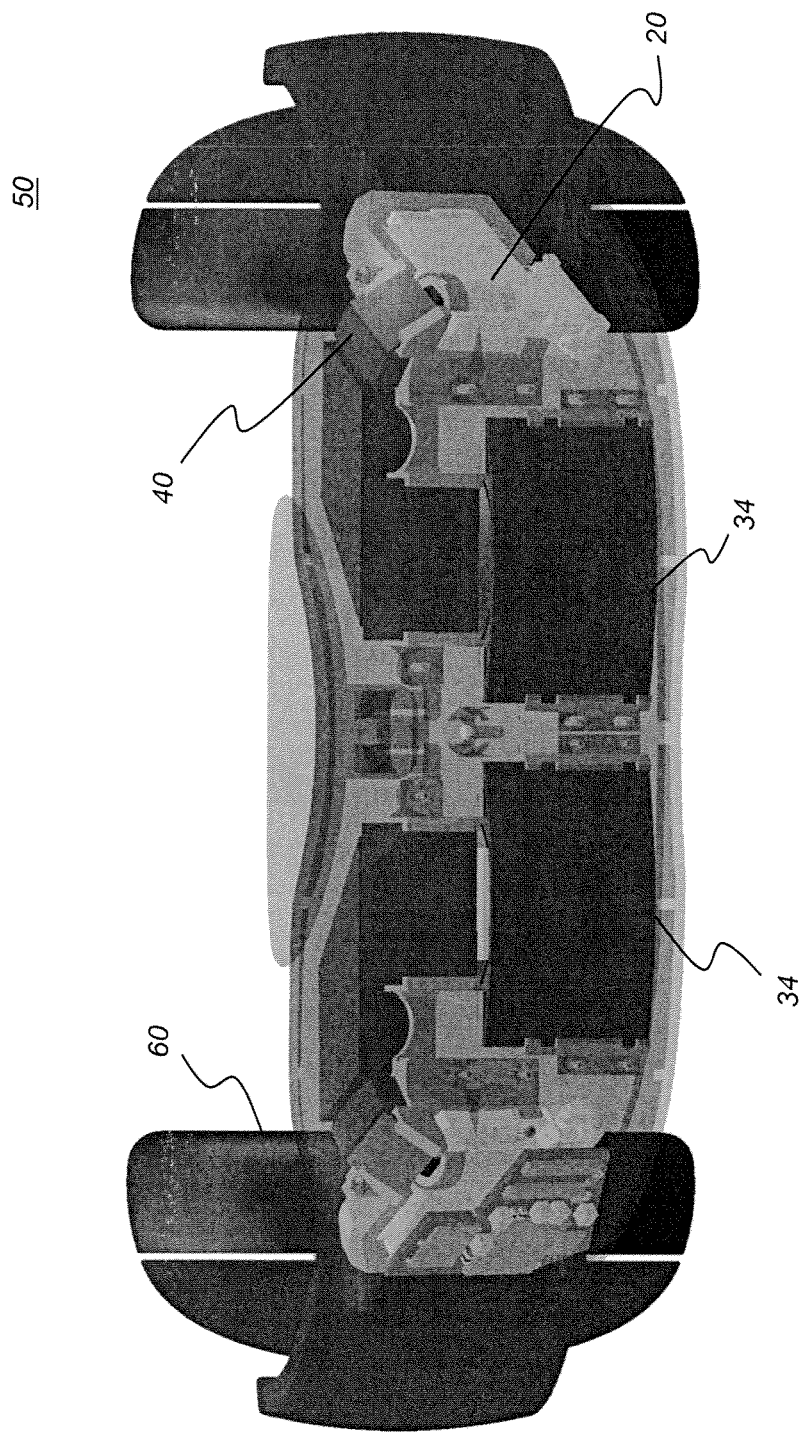
Figure 7B:
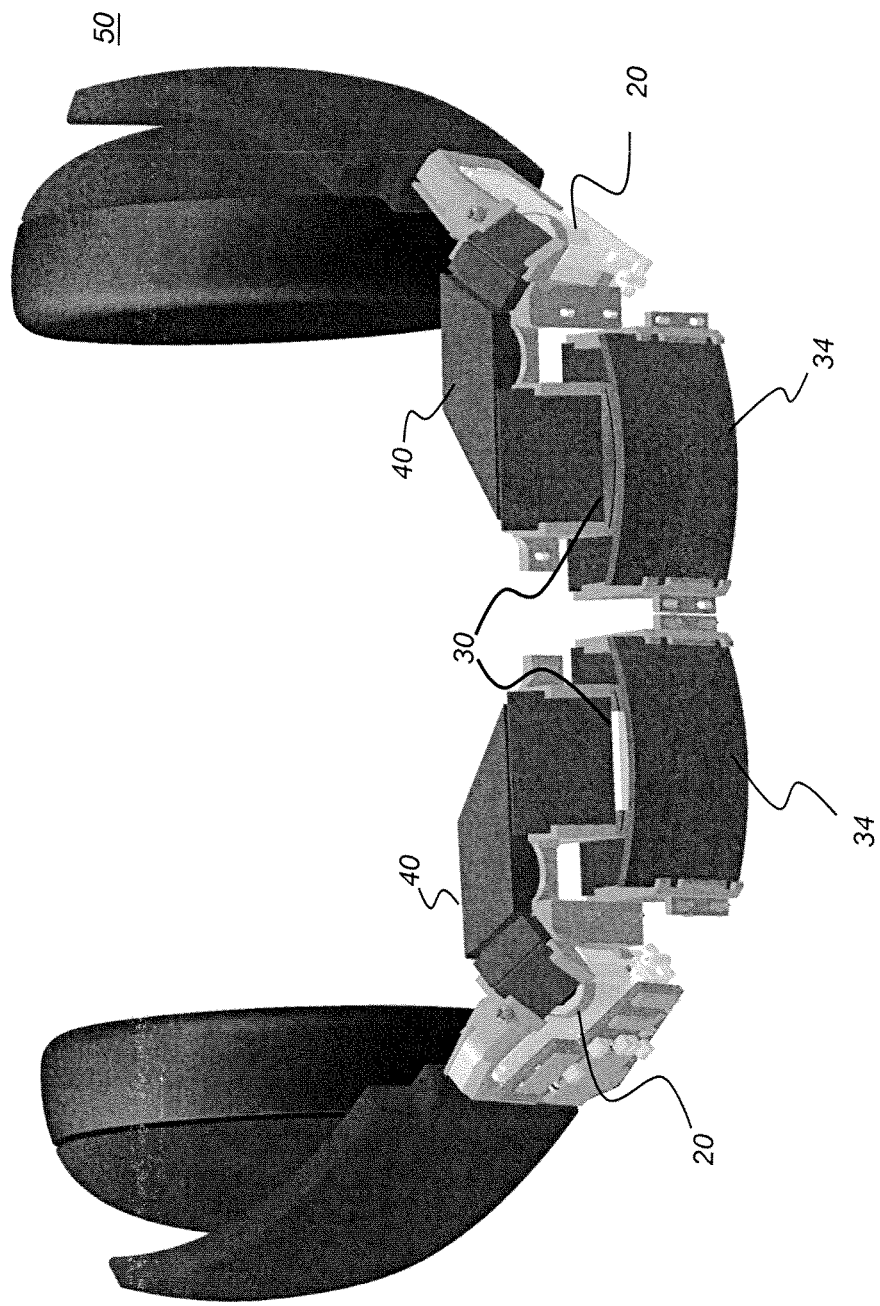
Figure 7C:
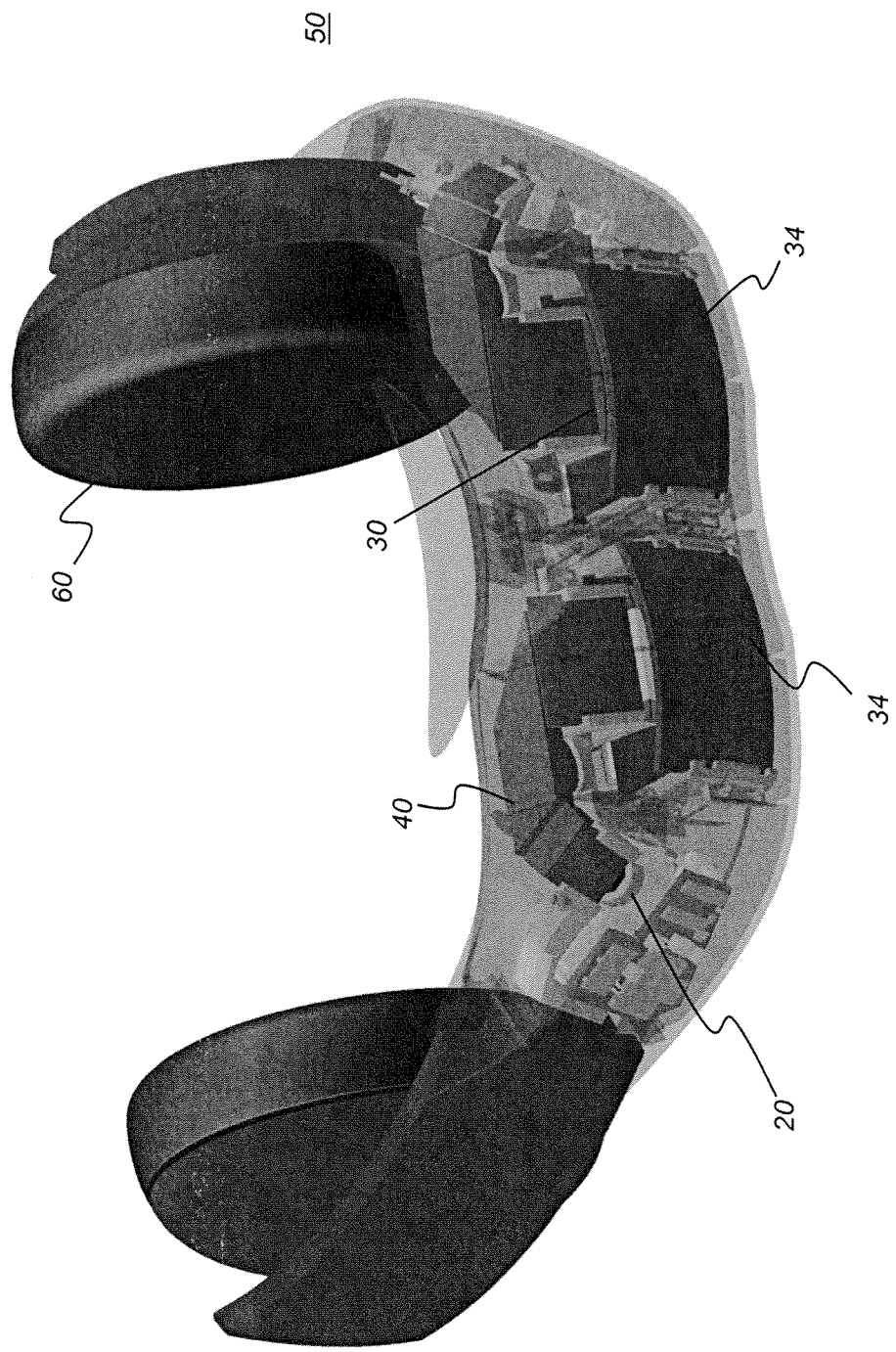

FIGS. 7A, 7B, and 7C are front perspective views that show components of a head-mounted apparatus for providing a virtual image to the observer.

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Where they are used herein, the terms "first", "second", and so on, do not necessarily denote any ordinal, sequential, or priority relation, but are simply used to more clearly distinguish one element or set of elements from another, unless specified otherwise. The terms "top" and "bottom" do not necessarily designate spatial position but provide relative information about a structure, such as to distinguish opposing surfaces of a planar (flat) waveguide.

In the context of the present disclosure, the terms "viewer", "operator", "observer", and "user" are considered to be equivalent and refer to the person who wears the HMD viewing device.

As used herein, the term "energizable" relates to a device or set of components that perform an indicated function upon receiving power and, optionally, upon receiving an enabling signal.

The term "actuable" has its conventional meaning, relating to a device or component that is capable of effecting an action in response to a stimulus, such as in response to an electrical signal, for example.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

In the context of the present disclosure, the term "oblique" means at an angle that is not an integer multiple of 90 degrees. Two lines, linear structures, or planes, for example, are considered to be oblique with respect to each other if they diverge from or converge toward each other at an angle that is at least about 5 degrees or more away from parallel, or at least about 5 degrees or more away from orthogonal.

In the context of the present disclosure, the term "coupled" is intended to indicate a physical association, connection, relation, or linking, between two or more components, such that the disposition of one component affects the spatial disposition of a component to which it is coupled. For mechanical coupling, two components need not be in direct contact, but can be linked through one or more intermediary components. A component for optical coupling allows light energy to be input to, or output from, an optical apparatus. The terms "beam expander" and "pupil expander" are considered to be synonymous, used interchangeably herein.

As an alternative to real image projection, an optical system can produce a virtual image display. In contrast to methods for forming a real image, a virtual image is not formed on a display surface. That is, if a display surface were positioned at the perceived location of a virtual image, no image would be formed on that surface. A virtual image display has a number of inherent advantages for an augmented reality display. For example, the apparent size of a virtual image is not limited by the size or location of a display surface. Additionally, the source object for a virtual image may be small; a magnifying glass, as a simple example, provides a virtual image of its object. In comparison with systems that project a real image, a more realistic viewing experience can be provided by forming a virtual image that appears to be some distance away. Providing a virtual image also obviates any need to compensate for screen artifacts, as may be necessary when projecting a real image.

Embodiments of the present disclosure provide an optical system for providing a virtual image with an enlarged view pupil.

The image space f/# of a projector depends on the distance to the image divided by the diameter of the system stop (approximated by the aperture size of the last optic). A projector at greater than f/2.6 over a reasonable distance would be too bulky for an HMD system. A more compact projector with an exit aperture diameter of 8 mm or less projecting at a >f/3.5 distance does not properly fill the aperture. The challenge for system optics is to provide an optical solution that provides an increased f/# without appreciably adding to the bulk of the optical system.

Figure 1:
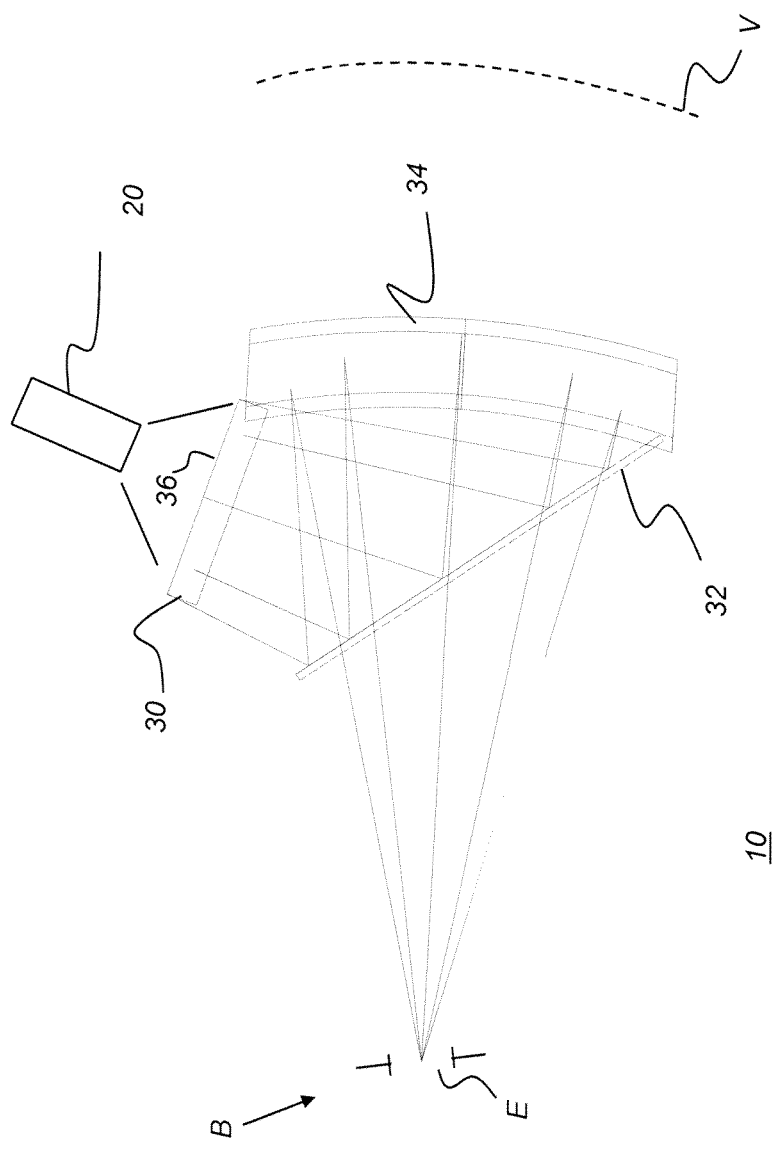
FIG. 1 is a schematic side view of the optical apparatus components for providing an image to one eye of the observer.

The schematic side view of FIG. 1 shows components of an imaging apparatus 10 for providing a virtual image to one eye at an exit pupil E that lies within an eyebox B that is defined between the two generally parallel lines shown and that defines where the image is visible to the observer. A projector 20 projects an image to a lenslet array 30 at an image plane, forming a real image that is at or near the lenslet array 30. Lenslet array 30 acts as a diffuser in transmission of light, as opposed to solutions that utilize a reflective diffuser. The substrate that provides lenslet array 30 is curved to reduce Petzval curvature in subsequent light handling. Lenslet array 30 is disposed at one focal length from a spherical curved mirror 34.

With respect to the view of FIG. 1, lenslet array 30 curvature extends into the page; an edge 36 is substantially parallel to the page surface and lies outside the page surface. Lenslet array 30 expands the effective beam width, and thus the f/# of the projected beam from projector 20. A beam splitter 32 directs the expanded beam toward spherical curved mirror 34 that forms a magnified virtual image V by redirecting the light toward exit pupil E. Virtual image V appears to lie beyond the outer edge of curved mirror 34. Eye box B is sufficiently sized to allow multiple pupil positions. The surface of curved mirror 34 is substantially spherical, but may have curvature that is not spherical. Curved mirror 34 can be partly transmissive, such as to allow the observer to see at least a portion of the actual ambient environment for augmented reality applications. An optical shutter, such as a mechanical shutter or light valve such as an LCD (liquid crystal device), can optionally be provided to control light transmission through the curved mirror 34 and to block or transmit light from the ambient environment.

Figure 2:
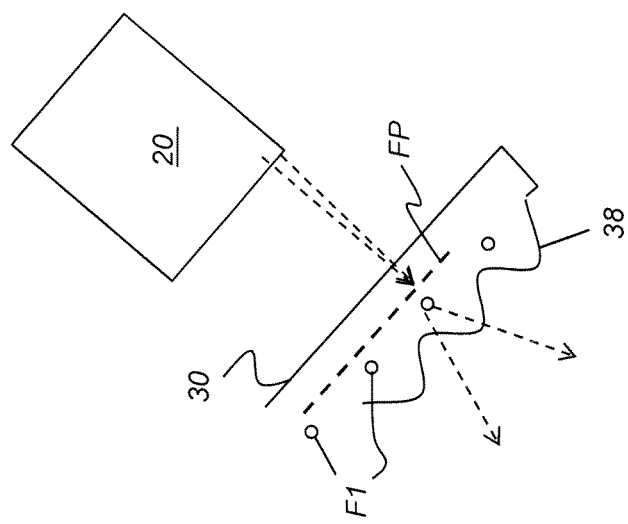
FIG. 2 is a schematic side view that shows how the lenslet array expands the pupil size.

FIG. 2 shows, with dimensions exaggerated for emphasis, how lenslet array 30 expands the beam width to provide a larger f/# within the optical system. Of particular interest are the following:

(i) Mapping of image pixels to lenslets. A 1:1 mapping of image pixels to lenslets is particularly advantageous. For this arrangement, the lenslet diameter is preferably about the size of an individual image pixel. A fewer than 1:1 mapping can alternately be provided.

(ii) Projector focus. Projector 20 focus near the focal plane of the lenslet array 30 is advantageous. A focal plane FP of projector 20 is shown by a dashed line in FIG. 2. As FIG. 2 suggests, projector 20 focus can be slightly offset, so that the projected image is focused along or within the substrate of the lenslet array 30 but slightly behind the focal points F1 of the individual lenslets 38 in the optical path. In this arrangement, the lenslet array is considered to be positioned adjacent to the image plane.

(iii) Enlarged angle. The projected light from projector 20 is typically in the range of about f/5 or higher, and can range from f/6 to f/10. The light expanded by lenslet array 30 is at about f/3.5 or lower.

(iv) Lenslet shape. Lenslets 38 in array 30 can be convex, concave, or other suitable shape.

Figure 3:
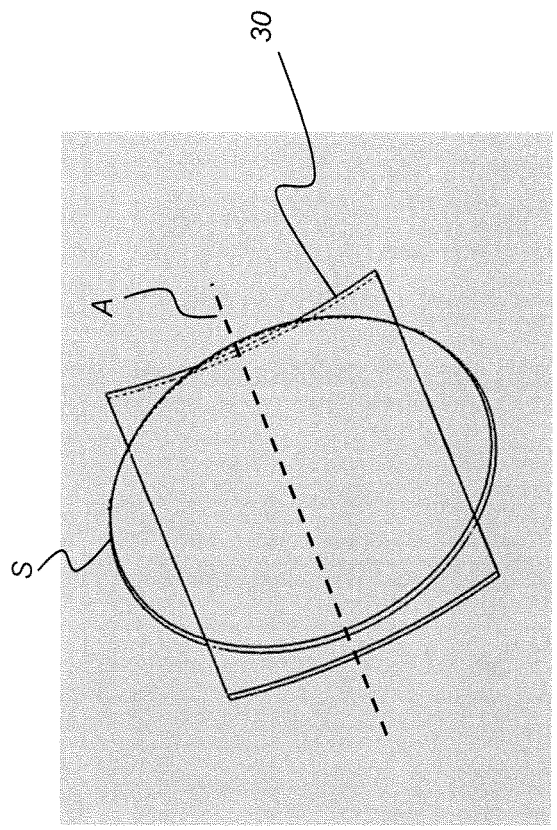
FIG. 3 shows field curvature applied to the lenslet array.

(v) Lenslet array 30 curvature. FIG. 3 shows lenslet array 30 curvature relative to a spherical curvature S. As shown in FIG. 3, lenslet array 30 is curved about a single axis A; over a relatively short distance this curvature can closely approximate spherical curvature S. The ideal curvature for the lenslet array 30 would be spherical; however, cylindrical curvature provides a reasonable alternative, as shown. This helps to reduce Petzval curvature effects. Curvatures of the image plane need not exactly match the Petzval curvature of the lens, but should be at least within about 1 Diopter, within a range that can be accommodated by a significant portion of the observer population.

Figure 4:
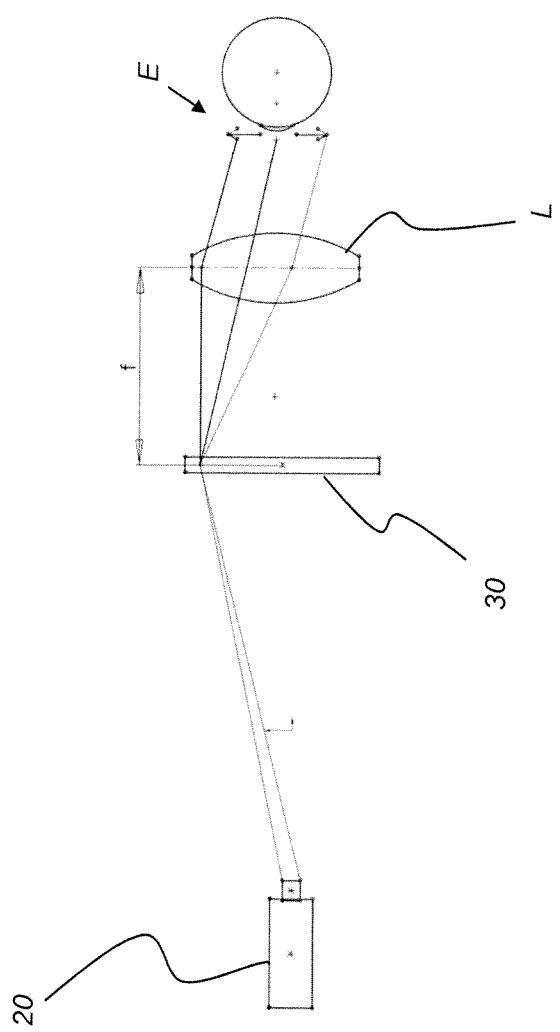
FIG. 4 is a schematic diagram that shows a general principle used for pupil expansion.

FIG. 4 is a schematic diagram that shows a principle of operation for the imaging system. Projector 20 forms a real image on lenslet array 30, which operates to spread the light from each pixel. The magnification system, represented schematically by a lens L in FIG. 4 but performed by curved mirror 34 in the optical imaging apparatus 10 of the present disclosure, then provides the light that forms the virtual image for the observer's eye. Light at the exit pupil is at least at about f/4.

Figure 5:
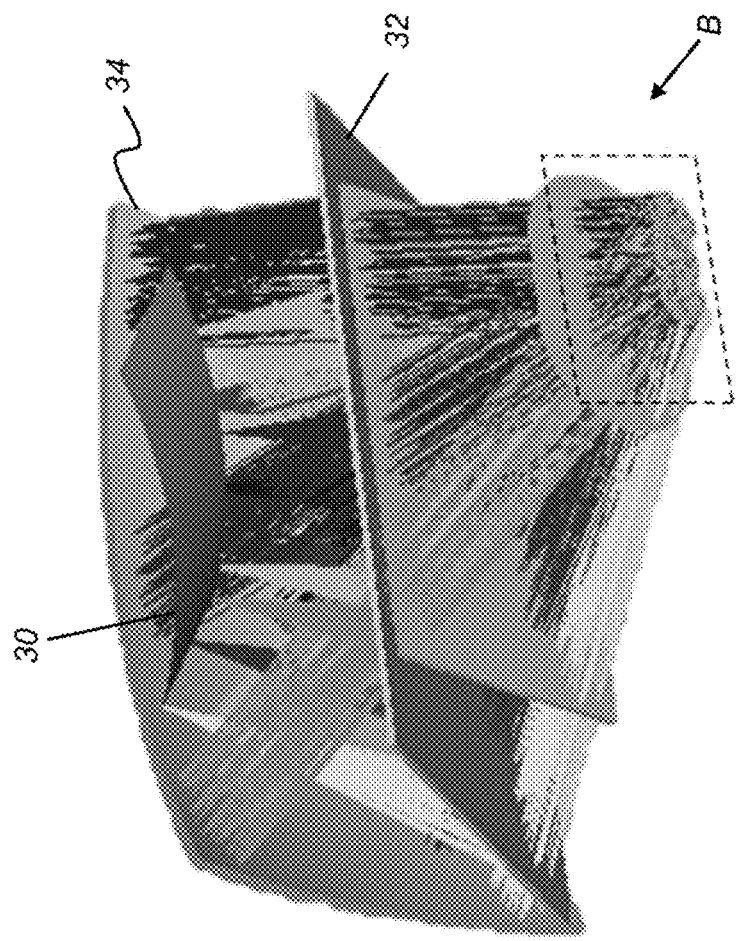
FIG. 5 is a perspective view that shows forming an image for one eye.

FIG. 5 is a view of a portion of a portion of the optical system that shows the relative position of the eye box B of the observer, in dashed outline.

Figure 6:
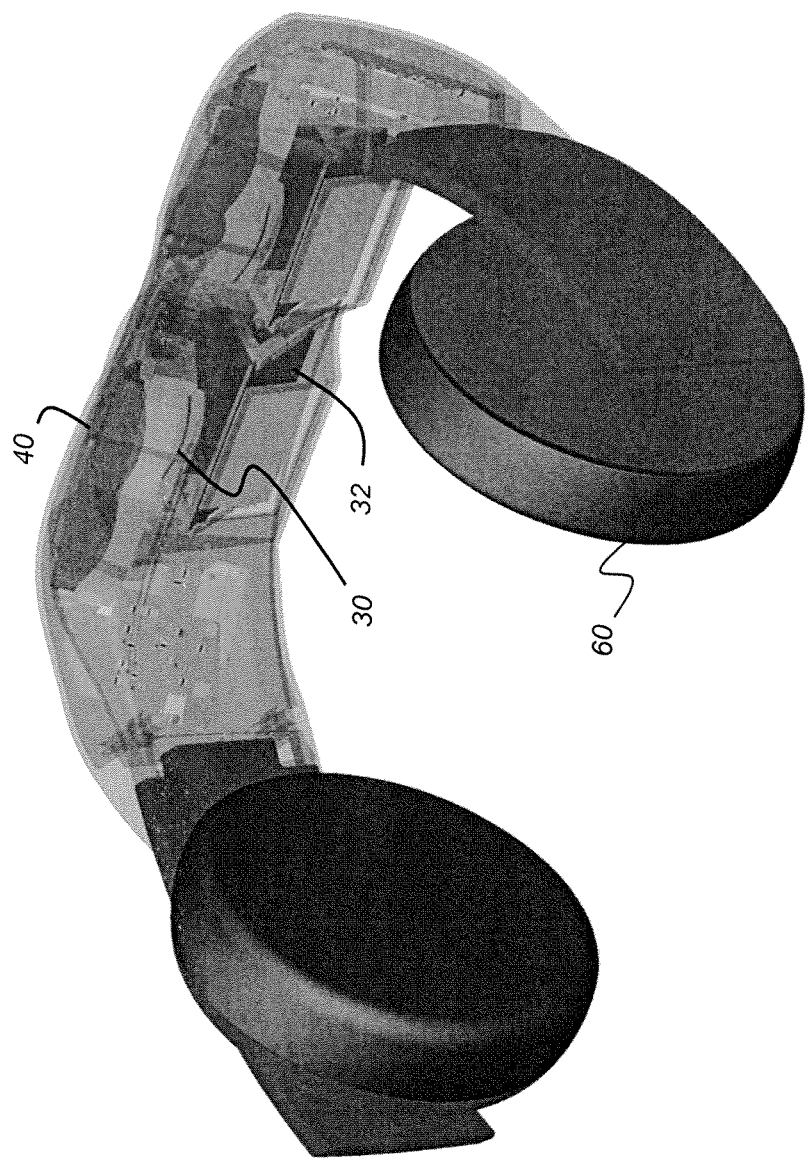
FIG. 6 is a perspective view from the viewing side that shows components of a head-mounted apparatus for providing a virtual image to the observer.

FIG. 6 is a rear perspective view that shows optical components in a head-mounted device (HMD) 50. FIGS. 7A, 7B, and 7C show views from in front of the observer. Light-conditioning optics 40 include one or more optical elements that direct and shape the image-bearing light from the projector in order to form a real image plane. Light conditioning optics 40 guide light from projector 20 and through curved lenslet array 30 to beam splitter 32. The front views of FIGS. 7A, 7B, and 7C show curved mirror 34 that forms the virtual image from the real image that is projected onto curved lenslet array 30. Headphones 60 provide audio signal output.

The lenslet array can be provided on a glass substrate or on a plastic substrate. Curvature of the lenslet array can be provided by permanently bending the array or by mounting the array in a frame that causes the array to bend to an appropriate shape. The projector can use a solid-state light source, such as a light-emitting diode (LED) coupled with one or more light modulating display panels such as liquid crystal on silicon (LCOS) or digital light processor (DLP), for example. Light-conditioning optics 40 can include lenses, mirrors, prism-based waveguides, or other devices to direct, shape, and modify the image-bearing light from the projector 20 to lenslet array 30. Image field or Petzval curvature can be achieved with proper design of all elements of light conditioning optics 40.

Embodiments of the present disclosure allow the use of a small projector device for displaying a virtual image to the observer with a large eye box.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A head-mounted imaging apparatus that comprises:
a projector that is energizable to project image-bearing light;
a light-conditioning element that directs and shapes the image-bearing light from the projector to form a real image plane;
a curved mirror that is partially transmissive to allow at least partial visibility of the ambient environment to one eye of an observer;
a lenslet array positioned adjacent to the real image plane and optically disposed at substantially one focal length away from the curved mirror, wherein a partially reflective surface of the curved mirror is substantially spherical; and a beamsplitter in the path of light from the real image at the lenslet array and disposed to direct at least a portion of the light from the real image toward the curved mirror;

wherein the curved mirror directs light from the beamsplitter to form a virtual image for the one eye of the observer who wears the head-mounted imaging apparatus, wherein the lenslet array includes a plurality of lenslets facing the curved mirror and having respective focal points, and the real image plane is located offset and before the image-bearing light passes through the focal points of the plurality of lenslets, and wherein the lenslet array includes a substrate that is curved about at least one axis.

2. The apparatus of claim 1 wherein the real image plane is located within the substrate.

3. The apparatus of claim 1 wherein the plurality of lenslets include respective convex surfaces projecting from the substrate toward the curved mirror, and the real image plane is located within the substrate.

4. The apparatus of claim 1 wherein a plurality of the projector pixels are mapped to the lenslet array in a ratio of 1:1 or less.

5. The apparatus of claim 1 wherein the lenslet array changes a pixel illumination from greater than about f/5 to less than about f/4.

6. The apparatus of claim 1 wherein one or more of the lenslets are concave.

7. The apparatus of claim 1 further comprising one or more headphones.

8. A method of assembling a head-mounted imaging apparatus for forming a virtual image for an observer, the method comprising:

arranging a projector to form a real image at an image plane;

positioning a lenslet array adjacent to the image plane;

positioning a curved mirror at substantially one focal length away from the image plane, wherein the curved mirror k partially transmissive to allow at least partial visibility of the ambient environment to an eye of the observer, and the curved mirror includes a partially reflective surface that is substantially spherical; and disposing a beamsplitter in the path of light from the real image at the lenslet array to direct at least a portion of the light from the real image toward the curved mirror;

wherein the curved mirror directs light from the beamsplitter to form the virtual image for the eye of the observer, wherein the lenslet array includes a plurality of lenslets facing the curved mirror and having respective focal points, and the step of positioning the lenslet array includes positioning the lenslet array so that the image plane is located offset and before the image-bearing light passes through the focal points of the plurality of lenslets, and wherein the lenslet array includes a substrate that is curved about at least one axis.

9. The method of claim 8 wherein the step of positioning the lenslet array, includes positioning the lenslet array so that the image plane is located within the substrate.

\* \* \* \* \*